United States Patent [19]

Hess et al.

[11] 4,168,718
[45] Sep. 25, 1979

[54] PASSIVE PROPELLANT SYSTEM

[76] Inventors: Robert A. Frosch, Administrator of the National Aeronautics and Space Administration, with respect to an invention of Donald A. Hess, St. Louis; William W. Regnier, Florissant, both of Mo.; Virgil L. Jacobs, Edwardsville, Ill.

[21] Appl. No.: 923,758

[22] Filed: Jul. 11, 1978

[51] Int. Cl.[2] ............................................. B64D 37/22
[52] U.S. Cl. ..................................... 137/177; 137/590; 137/574; 137/576; 137/209; 244/135 R
[58] Field of Search ............... 137/177, 183, 209, 590, 137/574, 576; 220/22; 244/158, 135

[56] References Cited
U.S. PATENT DOCUMENTS

| | | | |
|---|---|---|---|
| 3,202,160 | 8/1965 | Barger | 137/590 X |
| 3,744,738 | 7/1973 | Howard | 244/158 |
| 4,013,072 | 3/1977 | Jess | 137/177 X |

*Primary Examiner*—Alan Cohan
*Attorney, Agent, or Firm*—Joseph H. Beumer; John R. Manning; L. D. Wofford, Jr.

[57] ABSTRACT

A passive propellant acquisition and feed system is disclosed which will acquire and feed gas-free propellant in low or zero-g environments during orbital maneuvers which will also retain this propellant under high axially directed acceleration such as may be experienced during launch of a space vehicle and orbit-to-orbit transfers wherein the propellant system includes a dual compartment propellant tank with independent surface tension acquisition channels in each compartment to provide gas-free flow of pressurized liquid propellant from one compartment to the other in one direction only.

9 Claims, 4 Drawing Figures

PASSIVE PROPELLANT SYSTEM

ORIGIN OF THE INVENTION

The invention described herein was made in performance of work under a NASA Contract, and is subject to the provisions of Section 305 of the National Aeronautics and Space Act of 1958, Public Law 85-568 (72 Stat. 435,002 U.S.C. 2457)

BACKGROUND OF THE INVENTION

Orbiting space vehicles require propulsion systems with propellant feed devices which provide a continuous liquid propellant supply to the attitude control and/or maneuvering thrusters in on-orbit acceleration environments which is free of the pressurizing gas. Furthermore, shuttle type space vehicles will service many of these propulsion systems in orbit and, to be compatible with these operations, the propellant supply system must be re-usable.

Heretofore many spacecraft vehicles have provided propellant acquisition with positive expulsion devices primarily by the use of bladder type tanks. However, the requirement for multiple use propulsion systems dictates the use of propellant acquisition systems which are passive, that is, that have no moving parts and are not life limited. In the past surface tension or capillary propellant acquisition devices have been employed for some space vehicles, however, each design was customized for its own particular application and none of these prior systems afford wide re-usable application.

Accordingly, an important object of the present invention is to provide a passive propellant acquisition system for supplying gas-free propellant in low or zero-g environments which retains the propellant under high axial accelerations.

Another important object of the present invention is to provide a passive propellant acquisition system which is re-usable and is highly versatile affording application to a large number of space transportation systems such as orbit-to-orbit space shuttles and satellites.

Another important object of the present invention is to provide a propellant acquisition system which has no moving parts and thus does not have a limited life and can be used repeatedly in a variety of applications.

Yet another important object of the present invention is to provide a passive propellant acquisition system which is simple and relatively inexpensive to fabricate.

SUMMARY OF THE INVENTION

It has been found according to the invention that a re-usable passive propellant acquisition and feed system can be had by providing a spherical tank separated into two equal volume compartments by a flat bulkhead mounted between the two tank halves wherein each compartment has four similar screened gallery channel legs located in the principle vehicle axes ensuring that bulk propellant will contact at least one gallery leg during vehicle maneuvers. The forward compartment gallery channel legs collect propellant and feed it into the aft compartment through communication screens which protrude into the aft compartment. The propellant is then collected by the screened gallery channels in the aft compartment and supplied to the propellant outlet.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
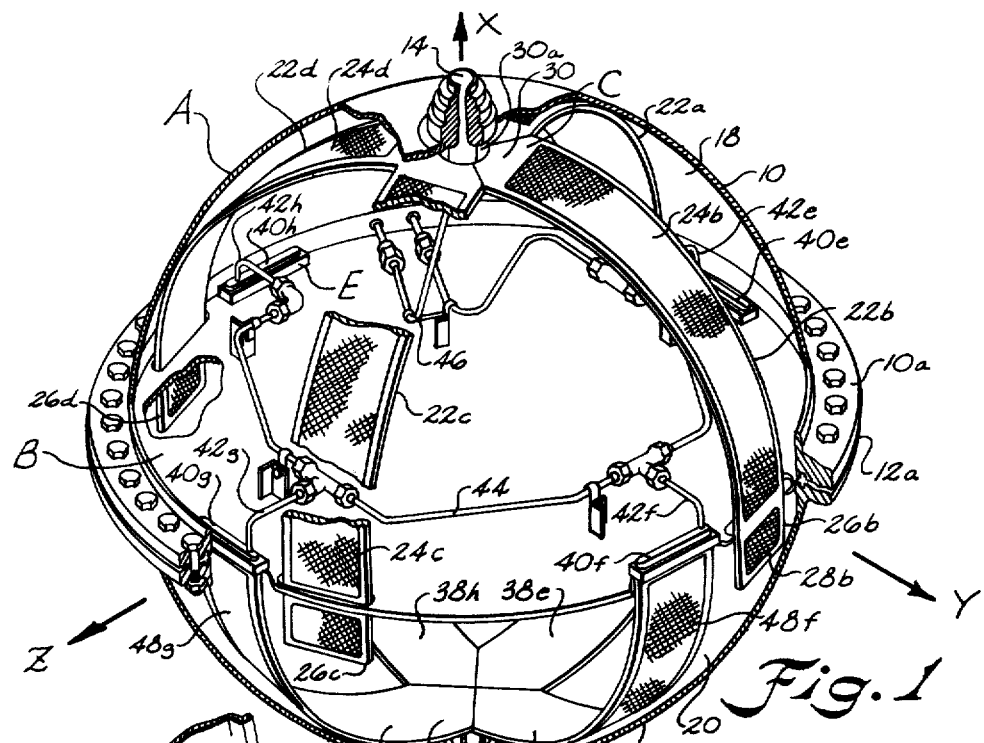
FIG. 1 is a partially cut-away perspective view of a passive propellant acquisition system constructed in accordance with the present invention.

The invention relates to a passive propellant acquisition system for collecting and feeding gas-free liquid in low or zero-g environments during vehicle orbital maneuvers while retaining the propellant under high axial accelerations that may be experienced during launch and orbit-to-orbit transfer of space vehicles. The system may have many applications but is particularly suited for feeding propellant to the thrusters of space shuttle vehicles and satellites for effecting attitude control and/or maneuvering operations. The passive propellant acquisition system has no moving parts and is particularly advantageous where a re-usable system is required. The primary advantage of the present propellant acquisition system is that it provides gas-free propellant to the thrusters during any combination of space craft environments.

Referring now in more detail to the drawing, the passive propellant acquisition system is illustrated as including a generally closed propellant vessel A preferably in the form of a sphere consisting of two hemispherical sections 10 and 12. The vessel includes a pressurant inlet 14 and a propellant inlet/outlet 16. The hemispherical sections 10 and 12 being provided with a flange portion 10a and 12a for securing the halves together. While the illustrated embodiment shows bolts for securing the flanges 18a and 12a, it is contemplated that a flight version of the vessel will be welded so as not to require the flanges and will be fabricated from titanium material affording a savings in weight.

Means for dividing the vessel into two compartments is provided by a flat internal metal builkhead B. The bulkhead divides the vessel into a first or forward compartment 18 and a second or aft compartment 20. The bulkhead is sandwiched and secured between flanges 10a and 12a in a fluid tight manner. Compartments 18 and 20 provide bulk regions for the supply of propellant.

Two independent gallery assemblies C and D are provided for acquiring the liquid propellant and delivering the liquid from the first and second compartments, respectively. The first gallery assembly C, carried within the first compartment 18, includes channel means through which acquired propellant is delivered provided by four individual tubular gallery channel legs 22a, 22b, 22c and 22d. These gallery channel legs acquire propellant by means of surface tension acquisition screens 24a, 24b, 24c, and 24d located on the exterior surface of the channel legs facing the wall of vessel A. When the screen surface is wetted, liquid propellant passes through at the liquid/liquid interface. However, the pressure differential at the gas/liquid interface at the unsubmerged portions of the screens will normally not be sufficient to overcome surface tension and allow pressurant gas to pass therethrough.

It will be noted that each channel leg 22a through 22d has an extended portion 26a, 26b, 26c, and 26d, respectively, which extends through the bulkhead B into the second compartment 20 providing the only flow path between the first and second vessel compartments. Communication surface tension screens 28a, 28b, 28c, and 28d are provided on the exterior surface of the respective channel leg extended portions as well as on the opposing interior surface of each extended channel leg portion affording fluid communication between flow in the channel legs and the second compartment. The use of dual screen minimizes the pressure differential across the bulkhead.

The gallery legs are curved to conform generally to the curvature of the hemispherical section 10 and each is carried closely adjacent the wall of the vessel on the order of 0.25 inch to one inch.

Gallery channel legs 22a through 22d are arranged in pairs of opposed legs which, in the illustrated spherical vessel, are diametrically opposed such as legs 22a and 22c defining a first pair and legs 22b and 22d defining a second pair of opposed channel legs. The plane of the first pair being perpendicular to the plane of the second pair whereby each individual leg is mutually orthogonal relative to the next adjacent leg. In use, the vessel is oriented such that the inlet 14 and outlet 16 are aligned along the longitudinal axis of the vehicle. In this position, the four channel legs of the first compartment will be oriented in the remaining principle vehicle axes assuring that bulk propellant will contact at least one gallery leg during vehicle maneuvers affording propellant acquisition by the acquisition screens regardless of propellant orientations in the tank. For example, the propellant outlet may lie along the longitudinal axis of the vehicle denoted by the X axis of a cartesion coordinate system with legs 22b and 22d located in the Y axis and legs 22a and 22c located in the Z axis.

The gallery assembly C includes a manifold 30 defined by the junction of the four channel legs 22a-22d having a sealed opening 30a through which the pressurant inlet tube extends in communication with compartment 18.

A gallery well E is carried by the bulkhead B and provides a sump means for draining and collecting the residual liquid propellant in the first compartment as it is used up. Each channel leg of the first gallery assembly C passes through a gallery well E into the second compartment 20 to acquire the propellant collected therein and facilitate the complete utilization of liquid propellant in the first compartment minimizing residual propellant.

Figure 2:
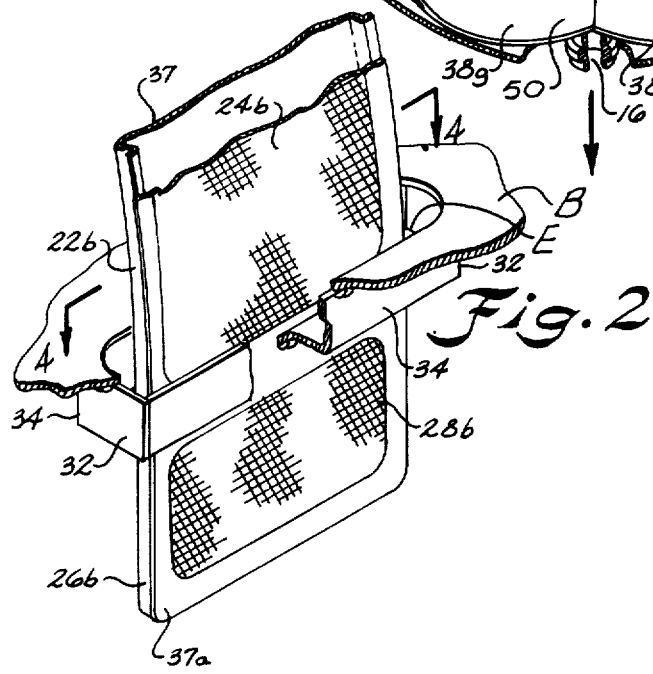
FIG. 2 is an enlarged perspective view with parts cut away illustrating a gallery well and channel leg construction according to the invention.
Figure 3:
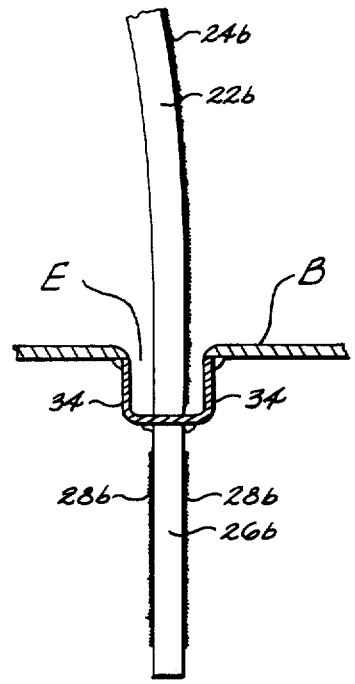
FIG. 3 is an enlarged elevation illustrating a bulkhead gallery well and channel leg construction according to the invention.
Figure 4:
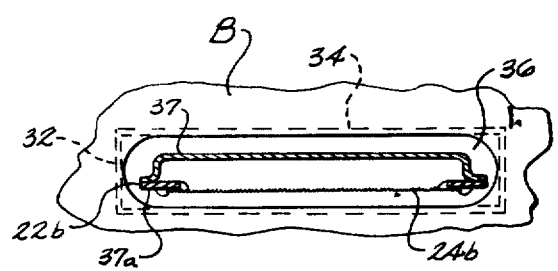
FIG. 4 is a sectional view taken along line 4—4 of FIG. 2.

As best illustrated in FIGS. 2-4, the gallery well E includes a welded construction of spaced end plates 32 and side plates 34 and a bottom plate 36 having an opening formed therein conforming generally to the shape of the tubular gallery channel legs passing therethrough. The gallery well may be secured in a fluid-tight manner to the bulkhead B by any suitable means such as welding with the channel legs welded in a fluid-tight manner to the gallery well bottom plate.

The details of one form of channels legs construction may be seen from FIGS. 2-4 wherein the channel legs includes a generally U-shaped channel 37 to which is fuse welded a screen frame 37a with the acquisition screen 24b being resistance roll seam welded onto the screen frame. Of course, it is to be understood, that other construction forms may also be had.

The propellant acquisition screens supply gas-free propellant as long as the pressure differential across the screen generated by propellant outflow and accelerations during vehicle maneuvers is less than the capability of the screen to sustain that pressure differential. If the screen pressure differential capability is exceeded, the surface tension breaks down allowing pressurant gas to be ingested into the channels. The capability of the screen to sustain this pressure differential depends on the screen hole size and the propellant fluid properties. In one application with hydrazine (N2H4) used as the propellant, an acquisition screen formed from 304 L stainless steel having a mesh of 325X 2300 wires per inch was found to afford a minimum hole size and greatest capability to sustain the pressure differential to achieve maximum efficiency of gas-free propellant expulsion from the system under a maximum flow rate of 1.18 lb/sec. and worst possible acceleration conditions of 3.3 g linear acceleration and 1.2 grms random vibration environment.

The aft gallery assembly D, carried within aft compartment 20, is constructed in an essentially identical manner to that of forward gallery assembly C and includes four gallery channel legs 38e, 38f, 38g and 38h which are peripherially spaced around the interior of the second compartment 20 mutually orthogonal to one another. Channel legs 38e and 38g form a first pair of diametrically opposed channel legs and legs 38f and 38h define a second pair of diametrically opposed channel legs. It will be noted, however, that channel legs 38e-38h are offset in peripheral spacing relative to channel legs 22a-22d to accommodate placement in bulkhead B.

Free ends of the respective channel legs 38 e-38h extend through bulkhead B and are affixed therein such as by welding to gallery well E as described earlier. However, the free ends are sealed by caps 40e-40h, respectively, and are not in fluid communication with compartment 18, the only flow path between compartments being through the communication screens 28a-28d. The gallery wells of the aft gallery assembly facilitate complete utilization of the liquid propellant in the second compartment minimizing residual propellant in a manner similar to the first compartment.

Each channel leg 38e-38g is vented by means of individual vent lines 52e-42h and common vent line 44 to the vessel exterior. Means for venting channel legs 22a-22d is provided by vent line 46 connected to manifold 30. The vent means are open during propellant loading to vent any gas from the vessel.

Surface tension acquisition screens, identical to the screen mesh of screen 24a-24d, are carried on the exterior surface of each channel leg 38e through 38h next adjacent the vessel wall in an identical manner. Only screens 48f and 48g may be seen from the illustration. The propellant acquisition screens allow the propellant accumulated in the second compartment 20 to flow through the channel legs 38e-38h into a manifold 50 defined by the junction of the individual channel legs outwardly through the propellant outlet 16 which is connected in direct communication to the manifold 50. Propellant may thereafter be delivered by a fuel line (not shown) to the vehicle thrusters. However, due to surface tension of the liquid propellant on screens 48, no pressurant gas will be acquired or fed to the thrusters.

OPERATION

During loading of the vessle A with liquid propellant, such as monopropellant hydrazine, the propellant tank is in a vertical position and the vessel is filled from the bottom through inlet/outlet port 16. Inlet and outlet lines with suitable valving may be provided at port 16 for this purpose. The vessel is completely filled assuring the initial wetting of all of the surface tension acquisition screens and then drained to the level required for mission propellant usage. The propellant is then pressurized in a conventional manner by introducing a pressurant gas into the first compartment 18 through the vessel pressurant inlet 14. One conventional method is to connect a bottle source of pressurant gas to the inlet which maintains a regulated gas pressure in the vessel. In one application with hydrazine, a pressure of 360 psi was utilized in the system. Other tank pressures may be used if the tank vessel is suitably designed. As propellant is used, it is withdrawn from the second compartment 20 of the vessel through the propellant outlet 16 by way of the channel legs 38. The channel legs 22 acquire propellant from the first compartment 18 and deliver the propellant to the second compartment 20. The wetting of the surface tension acquisition screens 24 and 48 assures that the liquid propellant is fed through the screens free of pressurant gas due to the lower flow resistance of the liquid/liquid interface. The gas free propellant will flow to the engines regardless of the orientation of the propellant or the vessel while the vehicle in which the vessel is mounted is being maneuvered. Once, the first compartment is depleted or propellant, surface tension of screens 24 may break down allowing the gallery channel legs 22a–22d to ingest the pressurant gas which then flows into the bulk region of the second compartment 20, however, the gas is not ingested by channel legs 38e–38h and they will continue to supply gas free propellant until compartment 20 is depleted. Utilizing the present system, 98% efficiency of gas free propellant expulsion has been achieved.

Owing to the independent gallery assembly and the acquisition screen design essentially one direction flow is provided from the forward to aft compartments. The communication screens 28a–28d prevent flow from the second to the first compartment after depletion of the first compartment by using the surface tension of the liquid at the communication screen to retain propellant in the second compartment during lateral or −x maneuvering. For +x maneuvering the fluid is oriented away from the communication screens and retention is not required. The pressurizing gas is allowed to pass from the first to second compartment when the pressure differential generated by liquid outflow through the outlet exceeds the liquid surface tension of the communication screen. Liquid flow in the reverse direction is prevented by the features of the design which do not allow the liquid pressure differential to exceed the liquid surface tension at the communication screen.

Thus, it can be seen that an advantageous construction can be had for a passaive propellant acquisition and feed system according to the present invention wherein no moving parts are utilized thus extending the life of the system for re-use and which acquires and feeds gas-free propellants in low or zero-g environments regardless of propellant orientation in the bulk regions of the supply vessel and retain the propellant under high axial accelerations.

While a preferred embodiment of the invention has been described using specific terms, such description is for illustrative purposes only, and it is to be understood that changes and variations may be made without departing from the spirit or scope of the following claims.

What is claimed is:

1. A passive propellant acquisition and feeding system comprising:
   a vessel for containing a liquid propellant having an inlet for the admission of pressurant gas and a propellant outlet;
   bulkhead means dividing said vessel into first and second compartments preventing fluid communication therebetween;
   a first gallery assembly carried in said first compartment having a plurality of individual channel means peripherially spaced around the interior thereof;
   said channel means extending through said bulkhead means in fluid communication with said second compartment establishing an exclusive flow path between said first and second compartments;
   first surface tension means carried by said channel means affording acquisition and feeding of said propellant through said channel means free of said pressurant gas;
   a second gallery assembly carried in said second compartment having a plurality of individual channel means peripherially spaced around the interior thereof communicating with said propellant outlet; and
   second surface tension means carried by said channel means of said second gallery assembly affording acquisition and feeding of gas-free propellant from said second compartment to said propellant outlet.

2. The structure set forth in claim 1 wherein each said channel means of said first and second gallery assembly includes:
   a first pair of channel legs carried closely adjacent a wall of said vessel in opposed relation;
   a second pair of channel legs carried closely adjacent said vessel wall in opposed relation in a plane perpendicular to the plane of said first pair of opposed channel legs; and
   each said channel leg of said first gallery assembly having an extended portion extending into said second compartment.

3. The structure set forth in claim 2 wherein said first and second surface tension means include:
   a propellant acquisition screen carried by each said channel leg on an exterior surface facing said vessel wall; and
   said first surface tension means further including a communication screen carried on said exterior surface of said extended portion of each said leg and on an oppositely facing interior surface thereof facilitating fluid flow to said second compartment.

4. The structure set forth in claim 2 wherein said second gallery assembly includes a manifold defined by the junction of said channel legs of said first and second pair, said manifold connected in fluid communication to said propellant outlet.

5. The structure set forth in claim 2 wherein each said gallery leg is secured to said bulkhead means.

6. The structure set forth in claim 1 including sump means carried by said bulkhead means providing a drain collector well for said liquid propellant and wherein said channel means of said first gallery assembly passes through said sump means for acquiring propellant collected therein facilitating complete utilization of said propellant in said first compartment.

7. The apparatus of claim 1 including vent means venting said first and second gallery assemblies to the exterior of said vessel.

8. A passive propellant acquisition feeding system comprising:
- a vessel for containing liquid propellant having an inlet for the admission pressurant gas and a propellant outlet;
- bulkhead means dividing said vessel into first and second compartments;
- the first gallery assembly carried in said first compartment having a plurality of individual channel legs orthogonally spaced around the periphery of said first compartment interior;
- said channel legs of said first gallery assembly extending through said bulkhead means in fluid communication with said second compartment establishing an exclusive flow path between said first and second compartments;
- a second gallery assembly carried in said second compartment having a plurality of individual channel legs orthogonally spaced around the interior thereof;
- manifold means defined by the junction of said channel legs of said second gallery assembly connected in fluid communication with said propellant outlet;
- surface tension propellant acquisition means carried by said channel legs of said first and second gallery assemblies affording acquisition and feeding of said propellant to said channel legs free of said pressurant gas; and
- gallery well means carried by said bulkhead means providing a sump for the collection of liquid propellant; and
- said channel legs of said first gallery assembly passing through said gallery well means for acquiring propellant collected therein facilitating complete utilization of said propellant in said first compartment.

9. The structure set forth in claim 6 including sump means carried by said bulkhead means providing a drain collector well for said liquid propellant in said second compartment in which said channel means of said second gallery assembly terminates in fluid communication facilitating complete utilization of said propellant in said second compartment.

* * * * *